B. H. SMITH.
ELECTRICAL MEASURING INSTRUMENT.
APPLICATION FILED NOV. 28, 1913.
1,194,084.
Patented Aug. 8, 1916.
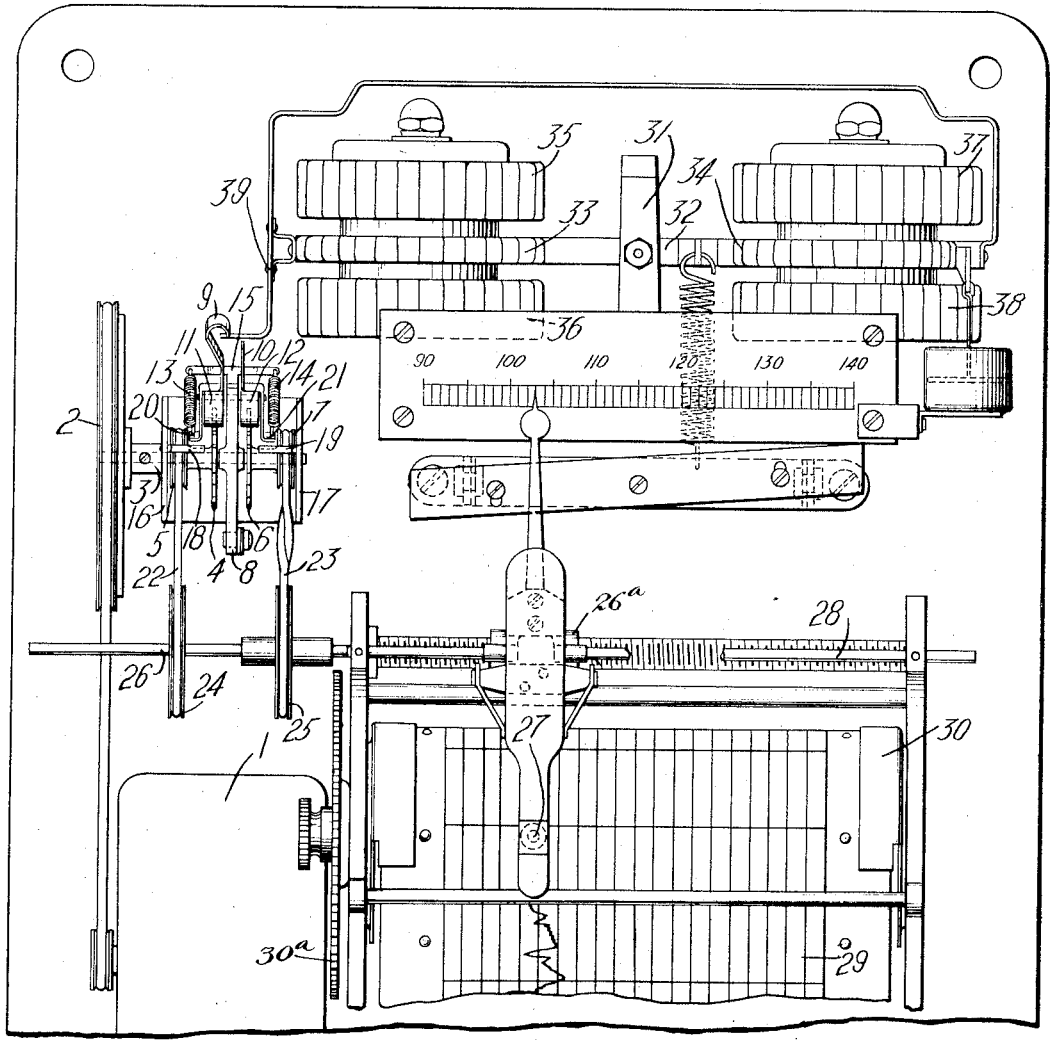
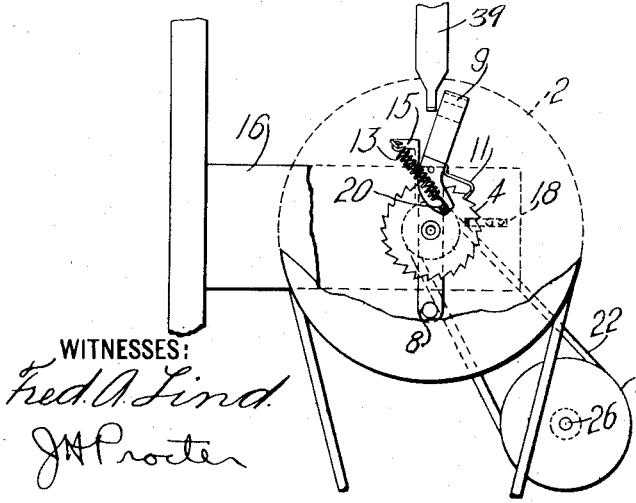
Fig. 1.
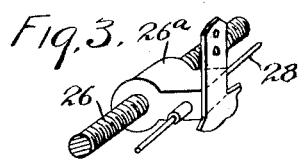
Fig. 3.
Fig. 2.
WITNESSES:
Fred A. Lind
J H Procter
INVENTOR
Benjamin H. Smith
BY
Wiley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,194,084.  Specification of Letters Patent.  Patented Aug. 8, 1916.

Application filed November 28, 1913. Serial No. 803,440.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Measuring Instruments, of which the following is a specification.

My invention relates to electrical measuring instruments and particularly to graphic meters.

The object of my invention is to provide a graphic meter having mechanically controlled contact terminals.

Much trouble has been encountered by the fusing of the contact terminals in graphic meters, as heretofore constructed. Considerable study and time have been devoted to efforts to avoid this defect in graphic meters and numerous mechanically controlled meters have been proposed.

My present invention is very compact in structure and may be applied to the usual forms of graphic meters.

In the accompanying drawings, Figure 1 is a fragmentary elevational view of a graphic meter embodying my invention; Fig. 2 is a side elevation of a mechanical controlling device used in my invention, and Fig. 3 is a perspective view of the screw-threaded shaft and its coöperating internally threaded members that are embodied in my invention.

My invention comprises a motor 1, driving a pulley 2, mounted on a shaft 3 upon which are loosely mounted a rotatable member comprising a ratchet wheel 4 and a pulley 5 operatively connected together and a rotatable member comprising a ratchet wheel 6 and a pulley 7 also operatively connected together. The shaft 3 has fixedly mounted thereon a counterbalanced member 8 that carries two pivotally mounted members 9 and 10. The pivotally mounted members 9 and 10 are unlike in shape but they have similar pawls, 11 and 12 attached to them. The members 9 and 10 are held in any predetermined position by springs 13 and 14 which are supported by a cross arm 15 attached to the counterbalanced member 8. The shaft 3 is supported by two stationary supports 16 and 17. Tripping pins 18 and 19, which engage extensions 20 and 21 of the pivotally mounted members 9 and 10, are mounted on the stationary supports 16 and 17. The extensions 20 and 21, when they respectively engage the pins 18 and 19 throw the pawls 11 and 12 out of engagement with the ratchet wheels 4 and 6.

The pulleys 5 and 7 respectively operate a straight belt 22 and a twisted belt 23 to drive pulleys 24 and 25 on a shaft 26. The shaft 26 is composed of two parts one of which constitutes a worm or screw that coöperates with an internally threaded member 26ª to operate a pen 27 which is guided by a rod 28. A record of the energy indicated by meter elements 31 is made by the pen 27 on a strip of paper 29 that is wound on a drum 30. The drum 30 is actuated by a clock mechanism (not shown) through a gear wheel 30ª. The meter elements 31 comprise a pivotally mounted member 32 carrying coils 33 and 34 on its respective ends, and stationary coils 35, 36, 37 and 38. To the pivotally mounted member 32 is attached a tripping member 39 for engaging the pivotally mounted members 9 and 10, such engagement depending upon the position of the member 32.

If the energy to be measured increases, the coil 33 of the pivotally mounted member 32 will rise between the stationary coils 35 and 36, and the tripping member, 39 since it is mounted on the member 32, will also rise. The motor 1 drives the shaft 3 and the counterbalanced member 8 at a predetermined speed that depends upon the calibration of the instrument. When the tripping member 39 rises, it engages the pivotally mounted member 9 on the counterbalanced member 8 and throws the pawl 11 into engagement with the ratchet wheel 4. Since the pulley 5 is attached to the ratchet wheel 4, the shaft 26 is driven in a direction which will move the pen to the right and thus record the increased increment of power. When the pivotally mounted member 9 has traveled a part of a revolution, the tripping pin 18 will throw the pawl 11 out of engagement with the ratchet wheel 4 and thus stop the movement of the recording pen. If the energy continues to increase, the member 9 will be set again by the member 39 and the pawl 11 will be again thrown out of engagement with the ratchet wheel 4 a definite interval later by the tripping pin 18, thus advancing the recording pen regularly in steps as many times as is necessary to record the energy being measured. Should the energy to be measured decrease, the tripping member 39 moves downwardly to engage the pivotally mounted member 10. The pawl 12 is thus thrown into contact with the ratchet wheel 6 which it rotates until it is tripped out of engagement by the pin 19. The ratchet wheel 6 being attached to the pulley 7 drives the shaft 26 through the belt 23 and the pulley 25 in a direction which is the reverse of that in which it was driven by the pulley 24 and the belt 22, thus the recording pen 27 will move toward the left and record the energy substantially as hereinbefore explained.

Should the energy become approximately constant, the coils 33 and 34 will take up a central position intermediate the stationary coils 35, 36, 37 and 38 and the tripping member 39 will be in such position that the pivotally mounted member 9 will pass above it and the pivotally mounted member 10 will pass below it, when rotating. Hence, the ratchet wheels will not be engaged, the shaft 26 will not be operated, and the recording pen 27 will remain in one position tracing a straight line on the paper as the drum moves. The springs 13 and 14 are utilized to hold the pawls 11 and 12 in engagement with the ratchet wheels against centrifugal force until they are thrown out by the pins 18 and 19, respectively.

Various changes in the means for driving the counterbalanced member, the means for tripping the same and for driving the recording pen may be made within the scope of my invention as set forth in the appended claims.

I claim as my invention:

1. In a measuring instrument, the combination with a meter having a tripping device, of a governing device comprising a uniformly rotating shaft, an arm mounted upon said shaft, two pawls pivotally mounted on said arm and so shaped as to engage said tripping device on said meter, two ratchet wheels loosely mounted on said shaft, and means for throwing said pawls out of engagement with said ratchet wheels.

2. In a graphical measuring instrument, the combination with a meter having a tripping device on the movable member thereof, of a recording mechanism, a mechanically operated governing device comprising a uniformly rotating shaft, an arm mounted on said shaft, two pivotally mounted pawls on said arm, loosely mounted ratchet wheels on said shaft, projections on said pawls for engaging the tripping device on the movable member of said meter, and means for throwing said pawls out of engagement with said ratchet wheels.

3. In an electrical measuring instrument, the combination with a meter having a tripping device on the movable member thereof, of a recording mechanism, a mechanically operated governing device comprising a uniformly rotating shaft, an arm mounted on said shaft, two pivotally mounted pawls on said arm, loosely mounted ratchet wheels on said shaft, projections on said pawls for engaging said tripping device on the movable member of said meter, and stationary projections for throwing said pawls out of engagement with said ratchet wheels.

4. In an electrical measuring instrument, a governing mechanism comprising uniformly rotating shaft, a counterbalanced arm mounted on said shaft, pivotally mounted pawls on the respective sides of said arm, ratchet wheels loosely mounted on said shaft, projections on said pawls for throwing said pawls out of engagement, and resilient means for maintaining said pawls in desired positions.

5. In an electrical measuring instrument, a governing device comprising a uniformly rotating shaft, a counterbalanced arm mounted on said shaft, pivotally mounted pawls on the respective sides of said arm, ratchet wheels loosely mounted on said shaft, projections on said pawls for throwing them into engagement with said ratchet wheels, and stationary projections for throwing said pawls out of engagement.

6. In an electrical measuring instrument, the combination with an electro-responsive device and a motor, of a governing device comprising a rotatable member operated by the motor, two pivotally mounted pawls mounted on the said rotatable member, two loosely mounted ratchet wheels adapted to be engaged by the said pawls, and means actuated by the said electro-responsive device for causing the said pawls to engage the said ratchet wheels under predetermined conditions.

7. A measuring instrument comprising an electro-responsive device, a rotatable member having two pawls pivotally mounted thereon, two loosely mounted ratchet wheels adapted to be engaged by the said pawls and a lever arm operatively connected to the said electro-responsive device for selectively throwing the said pawls into engagement with the said ratchet wheels under predetermined conditions.

8. A measuring instrument comprising an electro-responsive device, a rotatable member having two pawls pivotally mounted thereon, two loosely mounted ratchet wheels adapted to be engaged by the said pawls, means actuated by the said electro-responsive device for causing the said pawls to engage the said ratchet wheels under predetermined conditions and means for disengaging the said pawls from the said ratchet wheels at predetermined intervals of time.

In testimony whereof, I have hereunto subscribed my name this 24th day of Nov. 1913.

BENJAMIN H. SMITH.

Witnesses:
H. B. TAYLOR,
B. B. HINES.

---

Corrections in Letters Patent No. 1,194,084.

It is hereby certified that in Letters Patent No. 1,194,084, granted August 8, 1916, upon the application of Benjamin H. Smith, of Turtle Creek, Pennsylvania, for an improvement in "Electrical Measuring Instruments," errors appear in the printed specification requiring correction as follows: Page 2, line 84, claim 4, after the word "comprising" insert the article *a*; same page and claim, line 90, before the word "said" insert the words and comma *them into engagement with said ratchet wheels, means for throwing*; and that the said Letters Patent should be read with these corrections therein that the same may conform to the record of the case in the Patent Office.

Signed and sealed this 19th day of September, A. D., 1916.

[SEAL.]

F. W. H. CLAY,
*Acting Commissioner of Patents.*

Cl. 234—55.